(12) United States Patent
Bories et al.

(10) Patent No.: US 6,170,000 B1
(45) Date of Patent: Jan. 2, 2001

(54) USER INTERFACE, AND ASSOCIATED METHOD, PERMITTING ENTRY OF HANGUL SOUND SYMBOLS

(75) Inventors: Jolie Bories; Mateera Panichkul, both of San Diego; Ju Park, Chula Vista, all of CA (US)

(73) Assignee: Nokia Mobile Phones Ltd., Espoo (FI)

(*) Notice: Under 35 U.S.C. 154(b), the term of this patent shall be extended for 0 days.

(21) Appl. No.: 09/223,905

(22) Filed: Dec. 31, 1998

Related U.S. Application Data
(60) Provisional application No. 60/097,993, filed on Aug. 26, 1998.

(51) Int. Cl.[7] .................................................. G06F 17/21
(52) U.S. Cl. ........................ 707/535; 345/171; 345/172; 704/3
(58) Field of Search ..................... 707/535, 536; 455/550; 704/1, 3, 8; 345/156, 171–172

(56) References Cited

U.S. PATENT DOCUMENTS

| | | | |
|---|---|---|---|
| 4,187,031 | * | 2/1980 | Yeh .......................................... 400/83 |
| 4,951,202 | * | 8/1990 | Yan ........................................ 707/535 |
| 5,387,042 | * | 2/1995 | Brown .................................. 400/477 |
| 5,432,948 | * | 7/1995 | Davis et al. .............................. 704/2 |
| 5,526,477 | * | 6/1996 | McConnell et al. .................. 345/467 |
| 5,528,701 | * | 6/1996 | Aref ...................................... 382/178 |
| 5,673,064 | * | 9/1997 | Seto ...................................... 345/127 |
| 5,719,841 | * | 2/1998 | Kitayama ................................ 369/59 |
| 5,818,437 | * | 10/1998 | Grover et al. ......................... 345/352 |
| 5,873,111 | * | 2/1999 | Edberg .................................. 707/536 |
| 5,903,861 | * | 5/1999 | Chan ........................................ 704/9 |
| 5,933,525 | * | 8/1999 | Makhoul et al. ..................... 382/186 |
| 5,945,928 | * | 8/1999 | Kushler et al. ......................... 341/28 |
| 5,953,541 | * | 9/1999 | King et al. .............................. 710/67 |

OTHER PUBLICATIONS

Tegic Communications et al., Partnership, Enables tight Integration of Tegic Communications' T9 Text Input Technology with Unwired Planet's UP.Browser, Jun. 1998.*

SDin et al., A Statistical Approach with HMMs for On–line Cursive Hangul Recognition, IEEE International Conference on Document Analysis and Recognition, Sin et al., Jun. 1998.*

Margaret Kane, Software takes hassles out of cell phone E–mail, Jun. 1998.*

* cited by examiner

*Primary Examiner*—Joseph H. Feild
(74) *Attorney, Agent, or Firm*—Brooke Hayes; Holland & Hart LLP

(57) ABSTRACT

A user-interface, and an associated method, permits entry of sound symbols which form Korean-language characters. An actuation keypad formed of a telephonic keypad has associated therewith Hangul sound symbols of which the characters are formed. More than one sound symbol is associated with at least one of the telephonic keys. A control device determines, according to the syntax rules of the Korean language which of the more than one sound symbol associated with the actuation key actuated by the user is to be used to form the character.

25 Claims, 2 Drawing Sheets

USER INTERFACE, AND ASSOCIATED METHOD, PERMITTING ENTRY OF HANGUL SOUND SYMBOLS

This application claims the benefit of Provisional Application No. 60/097,993, filed Aug. 26, 1998.

The present invention relates generally to a user interface for an electronic device, such as a mobile station operable in a radio communication system. More particularly, the present invention relates to a user interface permitting user-entry of Hangul sound symbols which, alone or in combination, form Korean characters to be processed, or acted upon, by the electronic device. Advantage is made of the syntax structure of the Korean language in which sound symbols are of defined types and are of defined combinations of sound symbols.

BACKGROUND OF THE INVENTION

Many types of electronic devices provide for user control of the operation thereof. To permit such user control, many electronic devices include, as portions thereof, user interfaces to permit user-entry of inputs. Many of such user interfaces also include display elements upon which output displays generated during operation of the electronic devices can be displayed, or otherwise generated, in human-perceptible form.

A mobile station operable in a radio communication system, such as a cellular communications system, is exemplary of an electronic device which includes a user interface as a portion thereof. The user interface permits a user not only to enter commands to control operation of the mobile station, but permits the user also to enter data to be used during operation of the mobile station. And, the user interface of a conventional mobile station also includes a display element for the display of information generated during operation of the mobile station.

A conventional mobile station typically includes actuation keys, including a telephonic keypad. The telephonic keypad, in conventional manner, includes keys associated with the digits zero-nine, a "#" key and a "*" key. The user of the mobile station actuates selected ones of the keys of the telephonic keypad when, for instance, a call is to be originated at the mobile station. The keys of the telephonic keypad are also sometimes associated with alphabetical symbols. A user of the mobile station is also able to enter alphabetical information to the mobile station through appropriate actuation of selected keys of the telephonic keypad. Such alphabetical information forms informational inputs which are to be used during operation of the mobile station or to form control commands to control operation of the mobile station.

Markets for electronic devices, in many instances, cross national boundaries and are global in nature. Because of the extra-national nature of the markets for such electronic devices, a user interface appropriate for the market of one nation or area might not be appropriate for another nation or area. For instance, the symbols forming a Roman alphabet are markedly dissimilar to the symbols forming other types of alphabets. The symbols of the Korean language, for instance, are markedly dissimilar with the symbols of the Roman alphabet. Such symbols are sometimes also dissimilar with the characters used in other Asiatic languages. A user interface permitting a user to enter Roman alphabetical symbols would be of little practical benefit to many consumers of the electronic device in, for instance, Korea. Instead, a user interface permitting a user to input Hangul sound symbols, of which the characters of the Korean language are formed, would be of significant benefit to a user in Korea.

Therefore, a user interface for an electronic device which permits a user to enter Hangul sound symbols would advantageously facilitate the use of, and marketplace acceptance of, the electronic device by a user conversant with the Korean language. A mobile station, for instance, exemplary of an electronic device which uses a user interface as a portion thereof, almost by necessity must be operable when marketed in Korea, to permit a user to input Hangul sound symbols.

While user interfaces are available which permit a user to input Hangul sound symbols, the manner by which such existing user interfaces permit such symbols to be entered are somewhat cumbersome. Because of the relatively large number of Hangul sound symbols, mere association of a number of sound symbols with a single telephonic key of a telephonic keypad requires repeated actuation of the actuation key to select many of the sound symbols. And, use of a memory device in which a large number of characters formed of such sound symbols are stored is disadvantageous for the reason that the text that can be entered is dependent upon the contents of the memory at which the dictionary contents are stored.

Korean characters formed of Hangul sound symbols are, however, governed by fairly rigid syntax rules. If advantage could be taken of these rules and a specially designed keypad layout, a user interface could be created which facilitates convenient entry of the sound symbols, while also providing input flexibility, not otherwise permitted with dictionary-based systems.

It is in light of this background information related to user interfaces that the significant improvement of the present invention has evolved.

SUMMARY OF THE INVENTION

The present invention, accordingly, advantageously provides a user interface and an associated method, which permits a user to enter Hangul sound symbols therethrough.

The syntax rules of the formation of Korean characters of the Korean language are utilized in the operation of the user interface. The syntax rules permit only certain Hangul sound symbols, which alone or in combination, form the Korean characters to follow other symbols. Advantage is made of a combination of such rules and keypad layout to reduce the number of keystrokes by which actuation keys must be actuated in order to input the Hangul sound symbols.

The user interface, and its associated method of operation, can be used in conjunction with any text processing device to provide the input of Korean characters. Symbols are entered through actuation of actuation keys of an actuation keypad, such as a telephonic keypad. More than one symbol may be associated with a key of the telephonic keypad. If the symbol is an initially-entered symbol, the syntax rules of the Korean language are utilized to determine which of the more than one symbols associated with the actuation key is intended by the user to be entered. And, if the entered symbol has been preceded by a previously-entered symbol, determination of which of the more than one symbol associated with the actuation key is intended by the user to be entered is also determined by reference to the syntax rules of the Korean language.

In an exemplary implementation, the user interface is used in conjunction with a mobile station, such as a mobile station operable in a cellular communication system. A user forms characters by actuating the keys on a keypad associated with individual ones of the Hangul sound symbols of which the characters are formed. Responsive to the actuation of selected ones of the actuation keys, a determination is made as to which symbol is intended to be entered by the user by reference to the syntax rules of the Korean language. As a result, key actuations may be reduced. Determination of which one of more than one symbol associated with a particular actuation key is intended to be selected by a user is determined by reference to the syntax rules.

In these and other aspects, therefore, a user interface, and an associated method, is provided for entering Hangul sound symbols to be provided to a text processing device. The user interface includes a memory device having memory locations for storing data representative of each of the Hangul sound symbols. A user actuator permits user actuation thereof to select initiation of entry of selected ones of the Hangul sound symbols. A control device is coupled to receive indications of the actuation of the user actuator and to the memory device. Responsive to actuation of the user actuator, entry of the selected symbol is selectively permitted, dependent upon selected syntax rules.

A more complete appreciation of the present invention and to the scope thereof can be obtained from the accompanying drawings which are briefly summarized below, the following detailed description of the presently-preferred embodiments of the present invention, and the appended claims.

DETAILED DESCRIPTION

Figure 1:
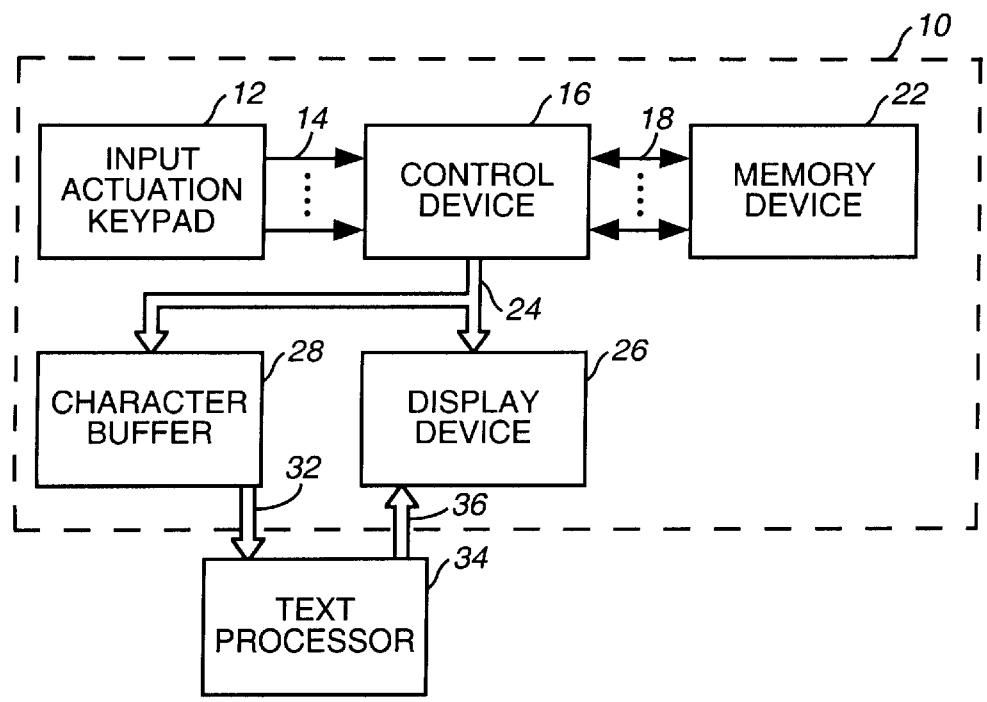
FIG. 1 illustrates a functional block diagram of the user-interface of an embodiment of the present invention.

Referring first to FIG. 1, a user-interface, shown generally at 10, of an embodiment of the present invention is operable to permit a user to enter Hangul sound symbols which, alone or in combination, form Korean characters used in the Korean language. The user-interface 10 along with the input activation keypad 12, noted below which forms a portion of the user interface, advantageously makes use of the syntax rules of the Korean language to reduce the number of keystroke actuations required of a user to input the sound symbols which form the characters. Operation of the user-interface is based upon the syntax rules of the Korean language. That is to say, entry of the sound symbols is dependent upon a rules-based determination; resorting to a fixed dictionary-type memory is not required.

The user-interface 10 includes an input actuation keypad 12 including a plurality of actuation keys (not separately shown in the Figure) to permit a user to actuate individual ones of the keys to initiate entry of selected sound symbols. The actuation keypad, in an exemplary keypad, includes the actuation keys of a conventional, telephonic keypad.

The input actuation keypad 12 is coupled by way of a plurality of lines 14 to a control device 16. The control device 16 is operable, selectively responsive to user actuation of the input keys to access, by way of the lines 18, memory locations of a memory device 22. Data representative of each of the Hangul sound symbols is stored at the memory locations of the memory device. In an exemplary implementation, the memory device 22 is formed of a ROM (read only memory) or other memory.

The control device 16 is further coupled, by way of the lines 24 to a display device 26 and to a character buffer 28. Indications of the sound symbols, i.e., the data representative thereof, are displayed upon the display device 26. And, such indications are further provided to the character buffer 28 to be buffered thereat. Characters formed of the symbols stored at the character buffer 28 are thereafter provided, here by way of the lines 32, to a text processor to be processed thereat. The text processor is here further shown to be coupled by way of the lines 36 to the display device 26 to permit display thereon of text once processed by the text processor.

The control device 16, in the exemplary implementation, is formed of a processor having algorithms executable therein for determining which sound symbol is entered by a user responsive to actuation of an actuation key of the input actuation keypad 12. The determination is made responsive to the syntax rules of the Korean language. For instance, if an actuation key of the keypad 12 is associated with a consonant and a vowel, the syntax rules of the language are followed to determine which of the symbols associated with the actuation key have been selected by the user.

Figure 2:
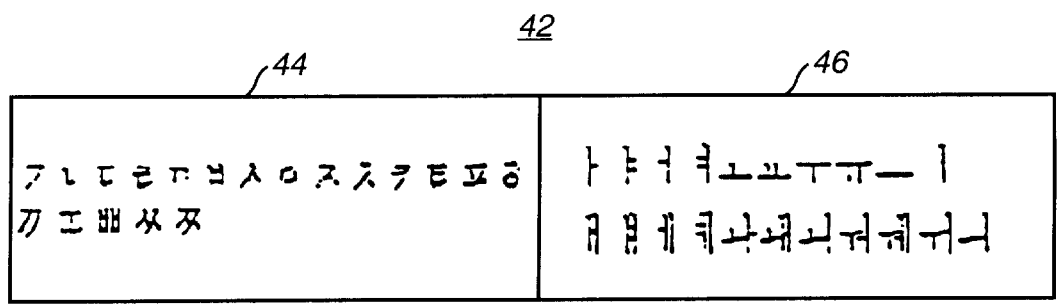
FIG. 2 illustrates a table listing the consonants and vowels of Hangul sound symbols.

FIG. 2 illustrates a table, shown generally at 42, which lists the consonant and the vowel sound symbols of the Hangul symbol set. The left-most (as shown) column 44 illustrates the nineteen consonant sound symbols (fourteen consonants and five double consonants) of the Hangul symbol set. And, the right-most (as shown) column 46 lists the twenty-one vowel sound symbols (ten monothong vowels and eleven dipthong vowels) of the Hangul symbol set.

Each of the fourteen consonant sound symbols shown in the column 44 can form a portion of a Korean character. Five of the fourteen consonants sound symbols can each be combined with itself to form a double consonant, which also can form a portion of a Korean character.

The ten monothong vowel sound symbols shown in the column 46 can also form a portion of a Korean character. Nine of the ten monothong vowel sound symbols are further combinable to form a diphthong. Up to two vowels can pair together with a monothong to form a diphthong, and, in two situations, a third vowel can also be added to form the dipthong vowel.

A Korean character can further be comprised of a coda or a double coda. A coda is formed of the basic, fourteen monathong monothong consonant sound symbols and can further include an additional consonant to form the double coda. There are up to twenty-seven codas. The double codas do not necessarily match that of the double consonants. In two situations, the double consonants match the double codas.

Each Korean character may consist of one of the following combinations: a consonant-vowel (CV), a consonant-vowel-coda (CVCo), or a consonant-vowel-coda-coda (CVCoCo). The CVCoCo combination is referred to as a double coda. This syntax which controls the formation of Korean characters is utilized during operation of an embodiment of the present invention. The syntax rules are used, for instance, to determine which, of more than one possible sound symbol entry associated with a single actuation key is intended to be selected by a user, all in a manner by which to minimize the number of keystrokes required of a user to enter the desired sound symbols to form a selected character.

Figure 3:
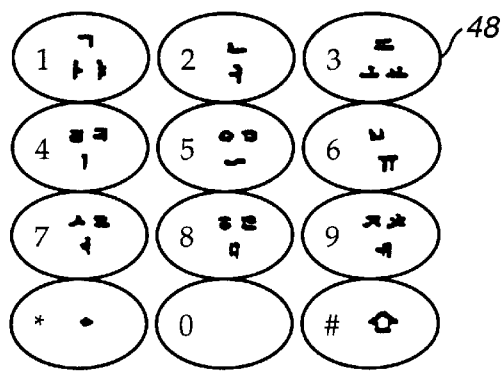
FIG. 3 illustrates an exemplary input actuation keypad of the user-interface shown in FIG. 1.

FIG. 3 illustrates an exemplary input actuation keypad 12 which forms a portion of the user-interface 10 shown in FIG. 1. Here, the keypad 12 is shown to be formed of three columns of four rows of actuation keys 48. The array formed of such an arrangement of actuation keys 48 is substantially similar to a conventional telephonic keypad. As illustrated, front face portions of the respective actuation keys 48 include the numerals zero-nine of a conventional telephonic keypad together with the star and pound indications. Each of the actuation keys 48 further includes sound symbols of the Hangul sound symbol set listed in the table 42 shown in FIG. 2.

In the exemplary implementation, individual ones of the actuation keys 48 have both consonant and vowel sound symbols printed thereon. It should be noted that the particular combinations of sound symbols associated with respective ones of the actuation keys can be formed in other manners and that the combinations shown in the Figure are exemplary. When a user desires to enter sound symbols which form a Korean character, the user actuates the individual actuation keys 48 associated with the sound symbols associated therewith, viz., the sound symbols printed on the face surfaces of the respective keys.

More particularly, the sound symbols associated with the various actuation keys 48 are selected in manners such that a user needs, at most, to actuate an actuation key no more than two times for any consonant when a consonant is desired or vowel when a vowel is desired, depending upon the mode in which the keys are selected to be operated, in order to cause a desired sound symbol to be entered. Several of the actuation keys have two sound symbols associated therewith; others of the actuation keys have three sound symbols associated therewith. Generally, two types of sound symbols are associated with each key. Viz., at least one vowel and at least one consonant is associated with a single key. If, e.g., two vowels are associated with the actuation key, and the mode in which the keys are selected is a "vowel" mode, a single actuation of the key within a selected time period results in entry of a first of the vowels and a double actuation of the key within the time period results in entry of the second of the vowels. Display of the selected, or to-be-selected, vowel is made upon the display device 26. Analogously, if the mode in which the keys are selected is a "consonant" mode, single or double actuation of the key is determinative of the selection of the consonant to be entered. Also, the types of sound symbols associated with individual ones of the actuation keys are selected such that no more than two actuations of an actuation key result in a desired sound to be entered. For instance, after a consonant (c) has been entered, the syntax rules generally require that a vowel be entered. User actuation of an actuation key having one consonant and one vowel associated therewith results in entry of the vowel, as necessitated by the syntax rules. Operation of other keys having different combinations of sound symbols associated therewith is effectuated in like manner.

Figure 4:
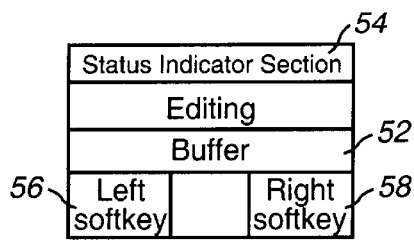
FIG. 4 illustrates an exemplary display device of the user-interface shown in FIG. 1.

FIG. 4 illustrates the display device 26 of the user-interface 10 shown in FIG. 1 of an exemplary embodiment of the present invention. In the exemplary implementation of the display device 26, the device is formed of a liquid crystal display (LCD), capable of displaying information thereon. The display device here includes a centrally-positioned editing buffer 52 capable of displaying a character as it is being formed or edited through entry by the user of selections of the Hangul sound symbols by way of actuation of the actuation keys 48 (shown in FIG. 3) of the actuation keypad 12. A status indicator section 54 is formed along a top (as-shown) portion of the display device. The status indicator section 54 in the exemplary implementation, indicates at least when the user-interface is being operated to input Hangul. The display device further displays left and right soft keys 56 and 58, or other designated keys, for editing, respectively, formed at the lower left and lower right (as shown) portions of the display device.

During operation of the display device 26, and before text has been entered by a user to be displayed at the buffer section 52, the left soft key 56 does not exhibit functionality, and the right soft-key displays the term "Back," if no other designated exit type key is available on the keypad. Once the user commences entry of sound symbols to form a character, the left soft key 56 indicates an "OK" indication, if no other designated accept type key is available, and the right soft key indicates "Clear," if no other clear type key is present. And, once the user completes the formation of a character such that subsequent entry of a subsequent character can commence, the left soft key 56 indicates "Options," if no other options or menu key is available, and the right soft key 58 indicates "Clear," if no other clear key is available.

When the user enters sound symbols through actuation of selected ones of the actuation keys of the actuation keypad 12, the sound symbol or cluster of sound symbols forming a character are considered to be selected and are grouped in a selection box appearing upon the editing buffer 52. The text within the selection box appears, e.g., as white-colored text on a black background. While the character is positioned in the selection box, the user can actuate the right soft key 58 in which the "Clear" designation is indicated to delete a previously-entered individual sound symbol or sound symbols from the character indicated in the selection box. A character is removed out of the selection box displayed at the centrally-positioned buffer 52 when the user indicates the character to have been completed and a subsequent sound symbol is entered. The character may also be removed out when the user enters a sound symbol that is not a valid combination, i.e., capable of forming a Korean character, with the sound symbols currently appearing in the selection box. Also, when the user elects to edit a non-selected character, the character can be deleted through actuation of the "Clear" soft key, if no other designated clear key is present on the keypad, formed of the right soft key 58.

If the character is displayed within the selection box formed at the buffer 52 and the user is in the process of entering a character, the user may actuate a scroll key (not shown) which also forms a portion of the input actuation keypad, thereby to indicate completion of the last inputted sound by displaying a cursor. A second scroll press deselects the character from the selection box. When no selection box is present on the display, the same scroll key can be utilized to scroll between characters. In one embodiment, there is not a designated selection box, this is generated when the user inputs an initial sound.

More specifically, when the user elects to enter one of the Hangul sound symbols, the user actuates the actuation key 48 associated with the selected sound symbol. In an exemplary implementation, once a character is entered, a blinking input cursor moves automatically to a subsequent character position to await entry of a subsequent sound symbol or when the combination of key presses indicate the start of the next character. Entry of a space between characters is effectuated by the user by actuating the actuation key 48 associated with the zero value if no other designated space key is available.

Provision is made by which to permit the display of punctuation symbols by way of actuation of the "Star" actuation key 48. And, the mode of operation of the user-interface 10 between Hangul input mode, numeric input mode, and Roman alphabet input mode is effectuated by actuation of the "Pound" actuation key 48. The mode in which the user elects the user-interface 10 to be operated is indicated in the status indictor section 54. When the user-interface is operable to enter Roman alphabetical characters, editing is effectuated also through actuation of the actuation keys.

When operated in the Hangul input mode, consonants, vowels, and codas can be entered, according to the syntax rules of the Korean language, by a user through actuation of the actuation keypad 12.

The control device 16 (shown in FIG. 1) permits a user to enter a consonant in one of three conditions. First, a consonant can be entered when the character buffer 28 is empty. The control device also permits a consonant to be entered when a new character, i.e., a subsequent character or the consonant-vowel-coda combination, is to be entered. And, a consonant is also permitted to be entered when the consonant-vowel (CV), or a consonant-vowel-coda (CVCo), combination is entered by the user in which the combination forms a coda or double-coda, respectively. When the editing buffer is empty or when a new character is to be entered, only the consonants that are associated with the actuation key 48 are selected by the control device 16 for entry during the initial actuation key press or key presses. Or, the user can enter a double consonant by long-pressing the actuation key, i.e., for an extended time period, associated with the respective consonant sound. A time-out occurs, such as a 0.45 second time-out, after entry of each sound symbol.

In the exemplary implementation, if the user actuates the actuation key a multiple number of times prior to the occurrence of the time-out period, the time-out only consonant options are available, if a consonant is to be added, and the control device causes cycling through available consonants. The consonant, so-selected, is provided to the editing buffer to be displayed in, for example, a full twelve-point font size. An analogous cycle is also provided for vowels.

According to the syntax rules of the Korean language, a vowel can be entered subsequent to entry of the initial consonant. When the user actuates an actuation key associated with the vowel desired to be entered, only the vowels that are matched to the actuated key are available for entry to form a portion of the character to be created. If the vowel sound symbol allows for the formation of a diphthong vowel, the user is able to actuate the key to form the diphthong vowel. Again, in the exemplary implementation, the pair of sound symbols, so-entered, are displayed at the display device in a full font size.

If the character desired to be entered by the user is formed of merely a consonant and a vowel, the user actuates the left soft key 56 formed of an "OK" indication if the subsequent consonant entered can form a CVCo. Such actuation indicates the completion of the character. The user may also press either the space or cursor movement key, when a cursor is present in the selection box, to indicate the end of the character. When the user indicates the end of the character, the selection box is removed from its display and a blinking cursor is displayed next to the character at the editing buffer 52 of the display device.

The user is further able to enter a coda, according to the syntax rules, subsequent to entry of a consonant and a vowel with the sound symbol combination still within the selection box. A double coda, if possible, can also be entered according to such syntax rules. The user actuates an actuation key associated with the desired consonant sound symbol. Only the consonant sound symbols are displayed, based upon the number of times in which the actuation key is actuated. The consonant-vowel-coda combination, readjust such that the three sound symbols form a full-sized font. If the consonant-vowel-coda form permits a double-coda with a specific activation key, the user is further able to actuate the actuation key that forms the double-coda. This occurs if the actual key pressed can form the double coda rather than just any key entering allowable double codas. If the first sound symbol is not permitted to be used to form the coda, the selection box expands to display the consonant-vowel-coda combination and also include the consonant that shall begin the initial consonant.

If a time-out occurs, the user can enter the vowel sound symbol for the second character and the selection box after the first character is removed. If the user actuates the key again, before the time-out occurs, the selection box displays merely the consonant-vowel-coda-coda combination.

Figure 5:
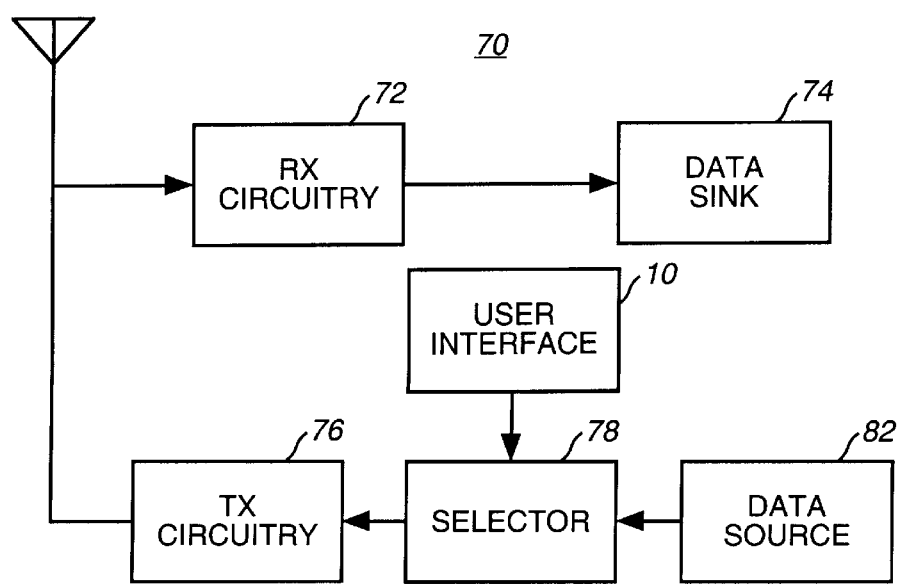
FIG. 5 illustrates a radio telephone which includes the user-interface shown in FIG. 1 as a portion thereof.

FIG. 5 illustrates a radio telephone, shown generally at 70, of an embodiment of the present invention. The radio telephone 70 includes the user-interface as a portion thereof. The radio telephone is shown to include a receiver portion, including receiver circuitry 72 and a data source 74. And, the radio telephone includes a transmitter portion, including transmitter circuitry 76 coupled by way of a selector 78 alternately to a data source 82 or to receive input characters generated during operation of the user-interface 10, as described above. In this manner, a radio telephone is provided which permits the entry of Korean characters for control and information data purposes. Short message service messages, e-mail, phone book entries, or the like, utilizing Korean characters is provided. Because the user-interface is a rules-based interface, reduction of the number of actuation key strokes required to enter the sound symbols forming such characters is provided.

The previous descriptions are of preferred examples for implementing the invention, and the scope of the invention should not necessarily be limited by this description. The scope of the present invention is defined by the following claims:

We claim:

1. In a text processing device operable to process text, an improvement of a user interface permitting a user to input Hangul sound symbols, the Hangul sound symbols defined as consonant and vowel sound symbols, of which individual ones of the Hangul sound symbols and selected combinations of the Hangul sound symbols form text characters, to the text processing device, the selected combinations combinable pursuant to selected syntax rules, the selected syntax rules define proper combinations of the consonant and vowel sound symbols that form the text characters, said user interface comprising;

a memory device for storing, in memory locations thereof, data representative of each of the Hangul sound symbols;

a user actuator actuatable by the user, selected actuation of said user actuator for initiating formation of at least a first selected text character, the first selected text character formed of a first selected combination of the Hangul sound symbols, data representative of which are stored at said memory device; and a control device coupled to receive indications of the selected actuation by the user of said user interface, said control device for controlling access to the memory locations of said memory device, such that the selected combinations are combinable according to the selected syntax rules, the selected syntax rules define proper combinations of the consonant and vowel sound symbols that form the text characters.

2. The user interface of claim 1 wherein the Hangul sound symbols comprise fourteen consonant sound symbols and ten monothong vowel symbols and wherein the memory location of said memory device are of memory capacities at least great enough to store data representative of each of the fourteen consonant sound symbols and of the ten monothong vowel sound symbols.

3. The user interface of claim 2 wherein five of the fourteen consonant sound symbols are combinable to form double consonant sound symbols, each of the double consonant sound symbols formed of pairs of the consonant sound symbols and wherein said control device controls access to the memory locations of said memory device to permit formation of the pairs of the consonant sound symbols.

4. The user interface of claim 2 wherein nine of the monothong vowel symbols are combinable to form diphthong vowel sound symbols, each of the diphthong vowel sound symbols formed of pairs of the monothong vowel sound symbols and wherein said control device controls access to the memory locations of said memory device to permit formation of the pairs of the monothong vowel sound symbols.

5. The user interface of claim 2 wherein the consonant sound symbols are further combinable with selected sounds to form codas, selected ones of the codas formed of sound symbols and other selected ones of the codas formed of double sound symbols, and wherein said control device controls access to the memory locations of said memory device to permit formation of the codas.

6. The user interface of claim 1 wherein said user actuator comprises an actuation keypad formed of actuation keys, each of the actuation keys actuable by the user, actuation of a selected actuation key in a selected manner representative of selection by the user of a selected Hangul sound symbol, of which the data representative thereof is stored at said memory device.

7. The user interface of claim 6 wherein more than one Hangul sound symbol is associated with at least one of the actuation keys of the actuation keypad, the at least one of the keys actuable in a first manner to access a first of the Hangul sound symbols associated with the actuation key and actuable in a second manner to access a second of the more than one Hangul sound symbol.

8. The user interface of claim 7 wherein the first of the Hangul sound symbols comprises a consonant sound symbol and wherein the first manner by which the key is actuable comprises actuation of the key for a first time period.

9. The user interface of claim 8 wherein the second of the Hangul sound symbols comprises a double consonant sound symbol and wherein the second manner by which the key is actuable comprises actuation of the key for a second time period, the second time period greater than the first time period.

10. The user interface of claim 9 wherein the key is further actuable in a third manner to access a third of the Hangul sound symbols, the third of the Hangul sound symbols formed of a consonant sound symbol, and wherein the third manner by which the key is actuable comprises actuation of the key a plurality of times within a selected time period.

11. The user interface of claim 7 wherein the first of the Hangul sound symbols comprises a monothong vowel symbol and wherein the first manner by which the key is actuable comprises actuation of the key for a first time period.

12. The user interface of claim 11 wherein the second of the Hangul sound symbols comprises a diphthong vowel sound symbol and wherein the second manner by which the key is actuable comprises actuation of the key for a second time period, the second time period greater than the first time period.

13. The user interface of claim 12 wherein the key is further actuable in a third manner to access a third of the Hangul sound symbols, the third of the Hangul sound symbols formed of a vowel sound symbol, and wherein the third manner by which the key is actuable comprises actuation of the key a plurality of times within a selected time period.

14. The user interface of claim 7 wherein the first of the Hangul sound symbols comprises a coda sound symbol and wherein the first manner by which the key is actuable comprises actuation of the key for a first time period.

15. The user interface of claim 14 wherein the second of the Hangul sound symbols comprises a double coda sound symbol and wherein the second manner by which the key is actuable comprises actuation of the key for a second time period, the second time period greater than the first time period.

16. The user interface of claim 1 wherein selective actuation thereof by the user initiates a delimiter indicative of formation of a selected text character.

17. The user interface of claim 1 further comprising a display device coupled to said control device, said display device at least for displaying representations of the Hangul sound symbols selected by the user through actuation of said user actuator.

18. The user interface of claim 1 wherein at least one actuation key has associated therewith at least one sound symbol of a first symbol-type, and a sound symbol of a second symbol-type, wherein the user interface is operated in a selected mode of entry, the selected mode of entry defined by a sound symbol-type, and wherein each sound symbol of which the at least the first selected text character is formed is selected by no more than double actuation of the user actuator.

19. A method of inputting user-selected text characters to a text processing device, the text characters formed of selected ones of, or selected combinations of, Hangul sound symbols, the Hangul sound symbols defined as consonant and vowel sound symbols, the selected combinations of Hangul sound symbols combinable pursuant to selected syntax rules, the selected syntax rules define proper combinations of the consonant and vowel sound symbols that form the text characters, said method comprising:

storing data representative of each of the Hangul sound symbols at a memory device;

selectively actuating a user actuator to initiate formation of a first selected text character, formed of a first Hangul sound symbol;

selectively actuating the user actuator to initiate combination of the first Hangul sound symbol with a second selected sound symbol if the first selected text character is to be formed of a combination of the Hangul sound symbols;

determining whether the first Hangul sound symbol is combinable with the second Hangul sound symbol if the combination is permitted by the selected syntax rules; and forming the combination if the combination is permitted; and providing the text character to a test buffer.

20. In a mobile station operable in a radio communication system, an improvement of a user interface permitting a user to input Hangul sound symbols, the Hangul sound symbols defined as consonant and vowel sound symbols, of which individual ones of the Hangul sound symbols and selected combinations of the Hangul sound symbols form text characters, the selected combinations combinable pursuant to selected syntax rules, the selected syntax rules define proper combinations of the consonant and vowel sound symbols that form the text characters, said user interface comprising:

a memory device for storing, in memory location thereof, data representative of each of the Hangul sound symbols;

a user actuator actuatable by the user, selected actuation of said user actuator for initiating formation of at least a first selected text character, the first selected text character formed of a first selected combination of the Hangul sounds symbols, data representative of which are stored at said memory device; and a control device coupled to receive indications of the selective actuation by the user of said user interface, said control device for controlling access to the memory locations of said memory device, such that the selected combinations are formable according to the selected syntax rules, the selected syntax rules define proper combinations of the consonant and vowel sound symbols that form the text characters.

21. A method for entering a text character comprising a plurality of Hangul sound symbols, the Hangul sound symbols defined as consonant and vowel sound symbols, into a text processing device having a graphical display and a memory using a keypad, the formation of the text character defined by syntax rules, the syntax rules define proper combinations of the consonant and vowel sound symbols that form the text character, the method comprising:

(a) storing in the memory a set of Hangul sound symbols comprising a plurality of monothong and diphthong vowel and single and double consonant sound symbols;

(b) associating each Hangul sound symbol of the set of Hangul sound symbols with a key on the keypad, wherein more than one Hangul sound symbol is associated with each key of a plurality of keys;

(c) dividing the graphical display into a text display, and at least one softkey display;

(d) depressing a first key of the keypad associated with a first consonant sound symbol until a desired consonant sound symbol is displayed in the text display, the desired consonant sound symbol displayed according to the syntax rules, wherein the first key is depressed:

(i) for a first time period if a consonant sound symbol is to be entered;

(ii) for a longer second time period if a double consonant sound symbol is to be entered;

(iii) a plurality of times if a plurality of consonant sound symbols are associated with the first key and the desired consonant sound symbol is different from an initially displayed consonant sound symbol;

(e) depressing a second key of the keypad associated with a vowel sound symbol until a desired vowel sound symbol is displayed in the text display, the desired vowel sound symbol displayed according to the syntax rules, wherein the second key is depressed:

(i) for the first time period if a monothong vowel sound symbol is to be entered;

(ii) for the longer second time period if a dipthong vowel sound symbol is to be entererd:

(iii) a plurality of times if the second key is associated with at least one of a plurality of vowel sound symbols;

(f) if the character is complete, depressing a soft key to indicate completion;

(g) if the character is not complete, repeating step (e) if a second vowel sound symbol is to be added, or, if a coda is to be added, depressing a third key associated with a second consonant sound symbol until a desired one of a single coda and a double coda is displayed in the text display, the single code and the double code displayed according to the syntax rules, wherein the third key is depressed:

(i) for a first time period of a single coda sound symbol is to be entered;

(ii) for a long second time period if a double coda sound symbol is to be entered; or (iii) a plurality of times if a plurality of consonant sound symbols area associated with the third key and the desired one of a single coda and a double coda is different from an initially displayed consonant sound symbol;

repeating steps (d) through (g) to enter any desired additional characters.

22. The method of claim 21, further comprising, after step (d), waiting a pre-determined time-out period before beginning step (e).

23. The method of claim 21, further comprising, after step (e), waiting a pre-determined time-out period before beginning step (g).

24. The method of claim 21, wherein a set of rules is stored in the memory for rejecting invalid combinations of consonant and vowel sound symbols and further comprising displaying in the graphic display an indication that a selected combination is invalid.

25. The method of claim 21, wherein the set of Hangul sound symbols comprises at least 14 consonant sound symbols and 10 monothong vowel sound symbols.

* * * * *